United States Patent [19]

Nagao et al.

[11] Patent Number: 4,606,029

[45] Date of Patent: Aug. 12, 1986

[54] DATA TRANSMISSION SYSTEM

[75] Inventors: Toshiaki Nagao, Muko; Toshio Shiho, Takatsuki, both of Japan

[73] Assignee: Omron Tateisi Electronics Co., Kyoto, Japan

[21] Appl. No.: 556,860

[22] Filed: Dec. 1, 1983

[30] Foreign Application Priority Data

Dec. 1, 1982 [JP] Japan .................. 57-211553

[51] Int. Cl.⁴ .......................................... G06F 11/14
[52] U.S. Cl. ............................................ 371/69; 371/6
[58] Field of Search .................... 371/69, 41, 6, 13

[56] References Cited

U.S. PATENT DOCUMENTS

| | | | |
|---|---|---|---|
| 3,449,716 | 6/1969 | Brothman et al. | 371/6 |
| 3,480,910 | 11/1969 | Brenza et al. | 371/6 |
| 3,919,690 | 11/1975 | Field et al. | 371/69 |
| 3,986,167 | 10/1976 | Paul | 371/69 |
| 4,093,825 | 6/1978 | Gladstone et al. | 371/69 X |
| 4,110,558 | 8/1978 | Kageyama et al. | 371/41 X |
| 4,286,334 | 8/1981 | Gammel et al. | 371/69 X |

Primary Examiner—Charles E. Atkinson
Attorney, Agent, or Firm—Wegner & Bretschneider

[57] ABSTRACT

A data transmission system includes a transmitter, a receiver and a transmission line. The transmitter produces data on the transmission line for a predetermined time, and the receiver reads in repeatedly and consecutively the data during the predetermined time. A predetermined number is set for repeatedly reading-in the data by the receiver. The number is determined by an external condition during a period of time in which the data are produced. The receiver accepts the data only when the data is read without any change for the determined number of times.

1 Claim, 6 Drawing Figures

DATA TRANSMISSION SYSTEM

BACKGROUND OF THE INVENTION

The present invention generally relates to a data transmission system and, more particularly, to a data transmission system in which the data to be transmitted tend to be adversely affected by noises.

There is known a control system wherein the control unit including a motor, a heater or the like and operable to actually control the temperature and/or humidity in a control object or controlled system, and a controller including a display unit and a setting unit for setting the temperature and/or humidity are separated from each other. In this type, data transmission is carried out between the control unit and the controller, and since the control unit includes a source of noises such as a motor or the like, data that can be transmitted therebetween must be of a nature hard to affect adversely by noises.

Apart from the above, in the temperature and/or humidity control system, the data transmission speed may be relatively low since the temperature and/or humidity in the control object do not change so quickly. Although it can be contemplated to transmit such data by the use of a hard logic device or logic hardware, the setting and the contents that can be displayed are simplified and it is difficult to add various functions. In addition, where data to be transmitted are in the form of an analog signal, a transmission interface unit must have the capability of effecting an analog/digital conversion, and an error in transmission is likely to occur during the conversion.

SUMMARY OF THE INVENTION

Accordingly, the present invention has been devised with a view to substantially eliminating the above described disadvantages and inconveniences inherent in the prior art data transmission system and has for its essential object to provide an improved data transmission system simple in structure and effective to assuredly transmit data full of noises.

According to the present invention, a system for transmitting data between a transmitter and a receiver through a transmission line comprises means for producing data to be transmitted on the transmission line from the transmitter for a predetermined time, and means for setting a number of times for repeatedly reading-in the data by the receiver. The number is determined by an external condition during a period of time in which the data are produced. It further comprises means for reading in repeatedly and consecutively the data during the predetermined time in which the data are produced on the transmission line, and accepting the data only when the data is read, without any change, for said number of times.

BRIEF DESCRIPTION OF THE DRAWINGS

These and other objects and features of the present invention will become clear from the following description taken in conjunction with a preferred embodiment thereof with reference to the accompanying drawings, in which.

DETAILED DESCRIPTION OF THE EMBODIMENT

Figure 1:
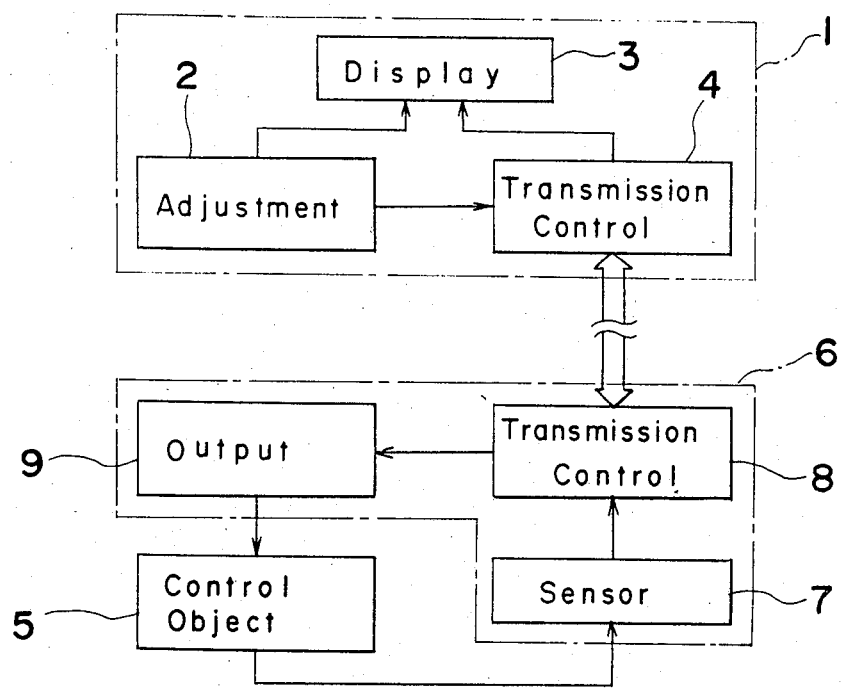
FIG. 1 is a schematic circuit block diagram showing a temperature control system embodying the present invention.

Before the description of the present invention proceeds, it is to be noted that like parts are designated by like reference numerals throughout the accompanying drawings.

Referring to FIG. 1, the temperature control system shown therein comprises an external controller 1 and a control unit 6.

The external controller 1, separated from the control unit 6, has an adjustment unit 2 for setting a temperature and a display unit 3 for displaying both the temperature set by the adjustment unit 2 and the current temperature. The external controller 1 further has a transmission control 4 for dealing with data transmitted from, and to be transmitted to, the control unit 6. The control unit 6 is connected with a control object 5 for controlling the temperature in the control object 5. It is to be noted that when the temperature control in the control object 5 is taking place, it is said that system control is taking place, and when the temperature control in the control object 5 is not taking place, it is said that non-system control is taking place.

The control unit 6 is provided in the control object 5 and includes a sensor 7 for detecting the temperature of the control object 5, a transmission control 8 and an output unit 9 comprised of a motor, a heater and/or the like. The control unit 6 is operable to control the temperature of the control object 5 through the output unit 9 under the control of the transmission control 8 on the basis of a sensor signal supplied from the sensor 7. The external controller 1 and the control unit 6 are connected with each other by means of a plurality of, for example, eight, transmission lines and a common ground line.

Figure 2:
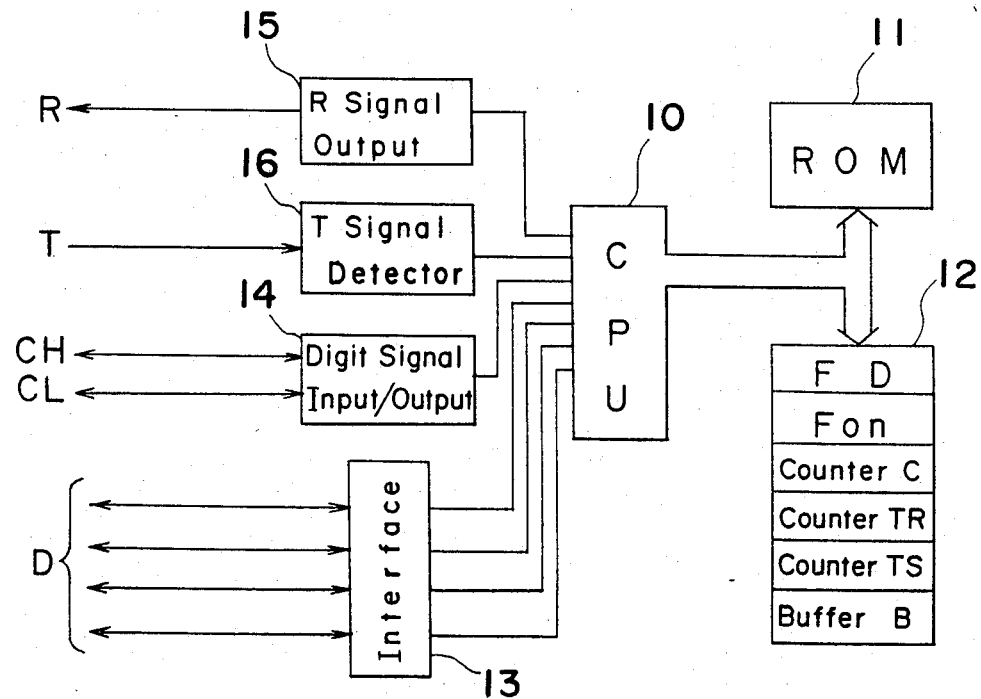
FIG. 2 is a schematic circuit block diagram showing the details of a transmission control used in the system of FIG. 1.

FIG. 2 illustrates the details of the transmission control 8 employed in the control unit 6. The transmission control 8 shown in FIG. 2 comprises a central processing unit (CPU)10 to which a storage means including a read-only memory (ROM)11 and a random access memory (RAM)12 is connected. The ROM 11 stores an operating program for the transmission control 8 and the RAM 12 has various storage areas for storing various pieces of information necessary for the data transmission. Contained in these storage areas of RAM 12 are: a transmission flag FD signifying that the transmission is taking place; a control execution flag Fon signifying that a system control of the control object 5 is being effected by the output from the output unit 9; a digit-place counter C signifying the number of digit places of the data to be transmitted (0 to 3 in the instance now under discussion); a time control counter TR for supervising the data read-in time, i.e., the time required to read in the data; a coincidence control counter TS for depositing the number of times of coincidence required during the data being read in; and a buffer B for the temporary storage of the data. Of the eight transmission lines, the four lines constitute a data line-bundle D connected to the CPU 10 through an interface 13. The two lines constitute digit-place signal lines CH and CL for defining the number of digit-places of the data transmitted through the data line-boundle D, and these two lines are connected to the CPU 10 through a digit-place signal input/output unit 14. The first of these two lines constitutes a transmission busy line R for transmitting a transmission busy signal from the control unit 6, and is connected to an R signal output unit 15. The other of these two lines constitutes a transmission timing line T which is given a transmission timing from the external controller 1, and is connected to the CPU 10 through a T signal detector 16.

The transmission control 4 in the external controller 1 is substantially similar in structure to the transmission control 8 in the control unit 6, but differs therefrom in that the transmission control 4 includes a T signal output unit in place of the T signal detector 16 used in the transmission control 8 and, also, an R signal detector in place of the R signal output unit 15 used in the transmission control 8.

Figure 3:
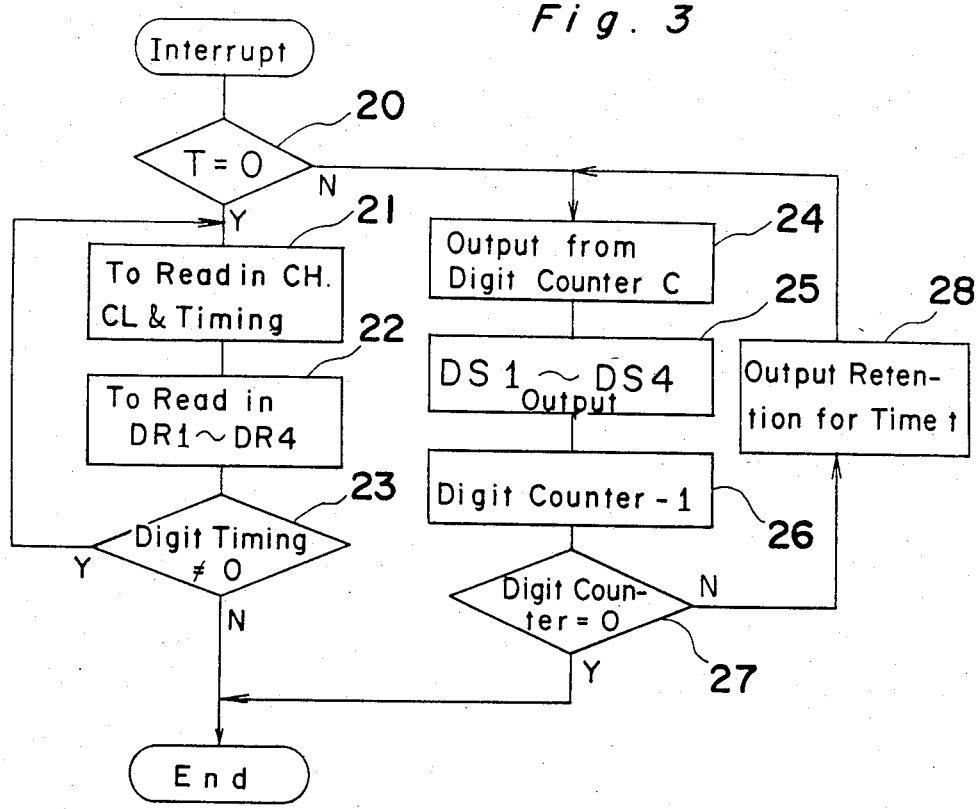
FIG. 3 is a flow chart showing the sequence of operation of an external or remote controller employed in the system of FIG. 1.
Figure 4:
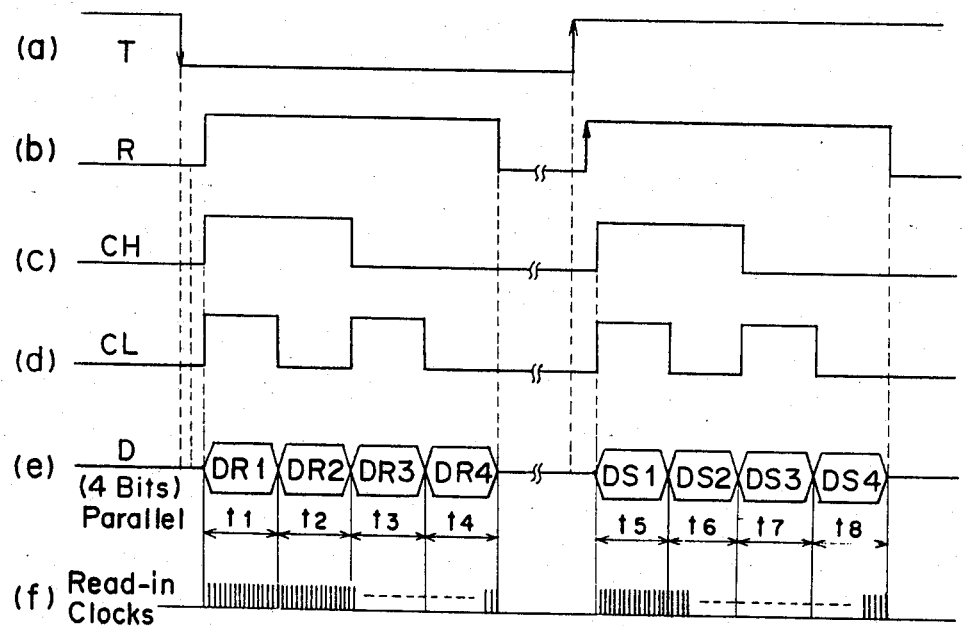
FIG. 4 is a diagram showing waveforms of various signals being transmitted, shown in timed relationship.

The operation of the temperature control system will now be described with reference to the flow chart of FIG. 3 and the chart of FIG. 4 showing waveforms of signals appearing on the transmission lines. Referring to FIGS. 3 and 4, from the external controller 1 emerges the transmission timing signal T at intervals of a predetermined time as shown by (a) in FIG. 4, and the control unit 6 generates, in response to the detection of the transmission timing signal T, the R signal at a timing of the step-up or step-down of the transmission timing signal T as shown by (b) in FIG. 4. In the external controller 1, if an interrupt request is made by means of the R signal from the control unit 6, a check is made at a step 20 as to whether or not the transmission timing T is zero. If the result of check at the step 20 indicates the transmission timing T being zero, it means that it is a time to transmit data from the control unit 6 to the external controller 1 and, therefore, at a step 21, the respective states of the digit-place signal lines CH and CL are read in and the number of digit-places of data transmitted is determined. Assuming that it is at the time shown by t1 in the waveform (e) in FIG. 4, that is, the digit-place signal lines CH and CL are "1 and 1", the digit-place signal line indicates the third digit-place according to the binary notation thereof. At the subsequent step 22, data of the instant digit place thereof, which are obtained from the data line-bundle D are read in. Then, at a decision step 23, it is determined whether or not the digit-place number is zero. If the digit-place number as determined at the step 23 is found to be either one, two or three, it means that there will be further data to be received and, therefore, the flow proceeds back to the step 21 to repeat the process of the steps 21 to 23. During the repetition, data of the data DR1 to DR4, i.e., specific data in the third digit place, second digit place, first digit place and zero digit place are read in at the respective time periods t1 to t4.

On the other hand, if the result of the check at the step 20 is such that the transmission timing T is 1, it means that now is the time to transmit data from the external controller 1 to the control unit 6. Therefore, at a step 24, a signal from the digit-place counter is outputed through the digit-place signal lines CH and CL.

In the instance now under discussion, it is assumed that the digit-place counter is initially set to three. Thus, both lines CH and CL produce "1", as shown by (c) and (d) in FIG. 4. At the step 25 subsequent to the step 24, data DS1 for the third digit place are outputed through the data line-bundle D and, at the following step 26, the digit-place counter is decremented to two. At a step 27, the digit-place counter is checked and, if the count of the digit-place counter is zero, the program terminates, but if it is not zero, the program proceeds back to the step 24 through the step 28 at which the state of the output thereof is retained for a predetermined time t. In other words, the output is continuously produced for a predetermined period of time t. By repeating the process of the steps 24 to 28, the signals DS1 to DS4 representing the third, second, first and zero digit places are successively transmitted to the control unit 6 at respective timings t5 to t8. During this signal transmission, the initial signal DS1 is a command to the control unit 6 and the other signals D2 to D4 carry the respective data.

Figure 5:
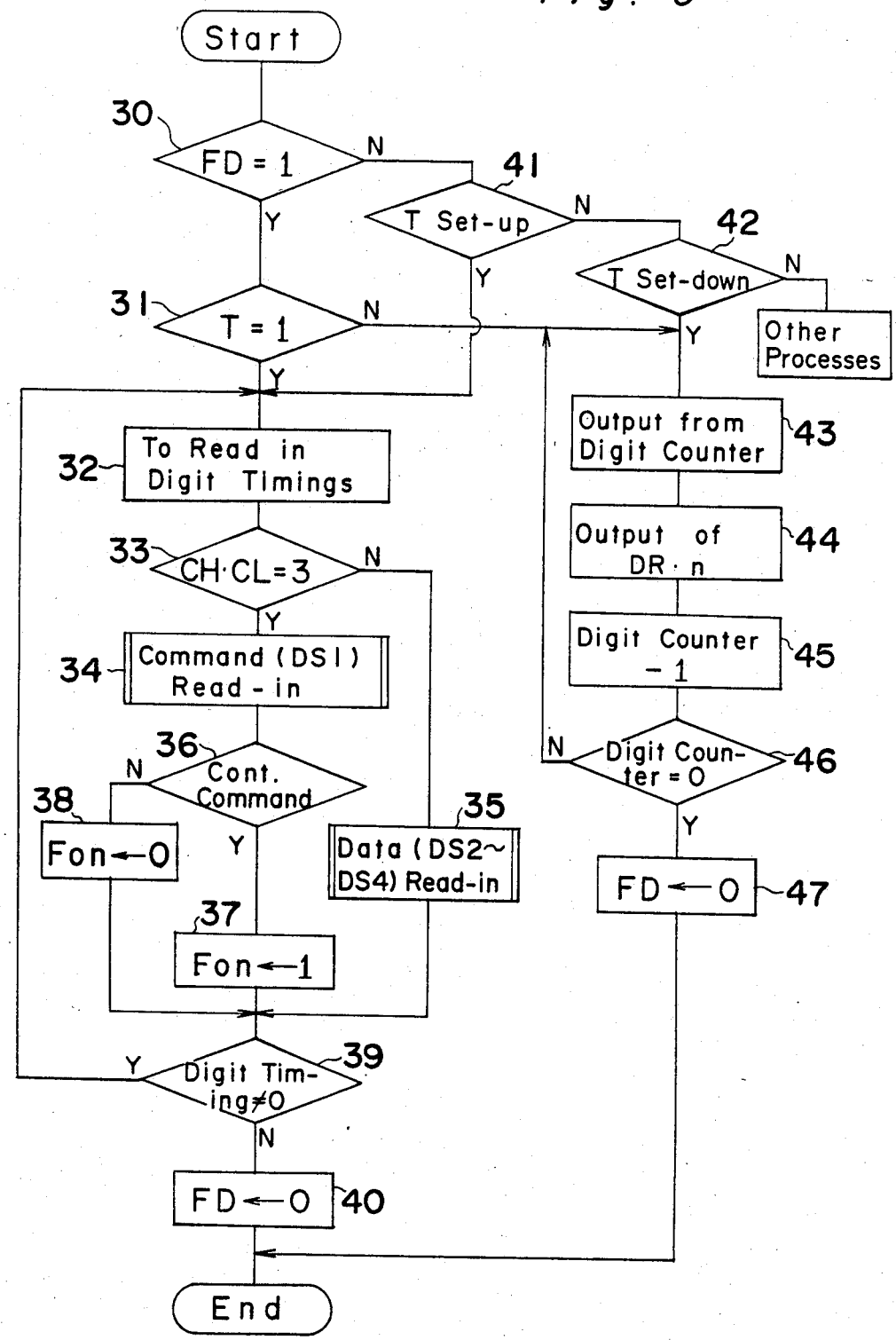
FIG. 5 is a flow chart showing the sequence of operation of a control unit employed in the system of FIG. 1.

The operation of the control unit 6 will now be described with reference to the flow chart shown in FIG. 5. When an interrupt request is made by a timer, a decision step 30 takes place to determine whether or not the transmission flag FD is set up. If the flag FD is set up, the data transmission takes place and another decision step 31 follows to determine the state of the transmission timing line T, i.e., the direction for transmitting the data. If the transmission timing line T is carrying 1, it means that the data transmitted from the external controller 1 should be received. Therefore, at the step 32, the digit-place signal on lines CH and CL is read in. At the subsequent step 33, the number of the digit-place is checked, and if it is found to be three, it means that the signal fed through the data line-bundle D is a command and, therefore, the command is read in by a routine at a step 34. On the other hand, the result of the check at the step 33 shows that the number of the digit-place is not three, it means that the signal fed through the data line-bundle D represent the data. In this case, the data on the line-bundle D are read in by a routine at a step 35. Subsequent to the command having read in by the routine at the step 34, the step 33 is followed by the decision step 36 to determine whether or not the command contains a control instruction to carry out a system control to the control object 5. When the command includes a proper instruction, the system control will be carried out to control the control object 5. In this case, the flag Fon is set at a step 37 indicating that the system control is being carried out. In other words, whenever the flag Fon is set, it is understood that the system control is effected. On the contrary, when the command includes no proper instruction, the flag Fon is reset at a step 38, indicating that the system control is not effected to control the control object 5. The flow then proceeds to the step 39 at which it is determined whether or not the digit-place signal is zero. If the result shows that it is not zero, the flow proceeds back to the step 32, but if it shows that it is zero, the transmission flag FD is reset at the subsequent step 40 and, then, the program flow terminates.

On the other hand, if the result of the decision at the step 30 shows that the flag FD is not set, indicating that no signal is being transmitted, the flow proceeds to steps 41 and 42 at which it is determined whether or not the transmission timing T steps up, or whether or not it steps down. If the transmission timing T steps up, it is understood that the receiving mode will be started.

Thus, the procedure advances to step 32. On the contrary thereto, if the transmission timing T steps down as determined at the step 42, it is understood that the sending mode will be started to send data to the external controller 1. Therefore, the procedure advances from the step 42 to step 43 at which a signal from the digit-place counter C is outputed through the digit-place signal lines CH and CL. As is the case with the digit-place counter in the external controller 1, it is also assumed that the counter C is initially set to three, and the digit-place signal indicates 1 at the timing t1 as shown by (c) and (d) in FIG. 4. Subsequently and at the step 44, the data DR1 of the third digit place is outputed and, at the following step 44, the digit-place counter C is decremented. The step 45 is then followed by the decision step 46 at which the digit-place counter C is checked. If the result is that the counter C is zero, the flow proceeds to a step 47 at which the flag FD is reset, and then terminates. However, if the result is to the contrary, the flow proceeds back to the step 43 to cause the lines CH and CL to carry 1 and 0 representing the second digit-place. Thereafter a similar process is repeated. In this way, the data DR1 to DR4 of the third, second, first and zero digit places are transmitted to the external controller 1.

Figure 6:
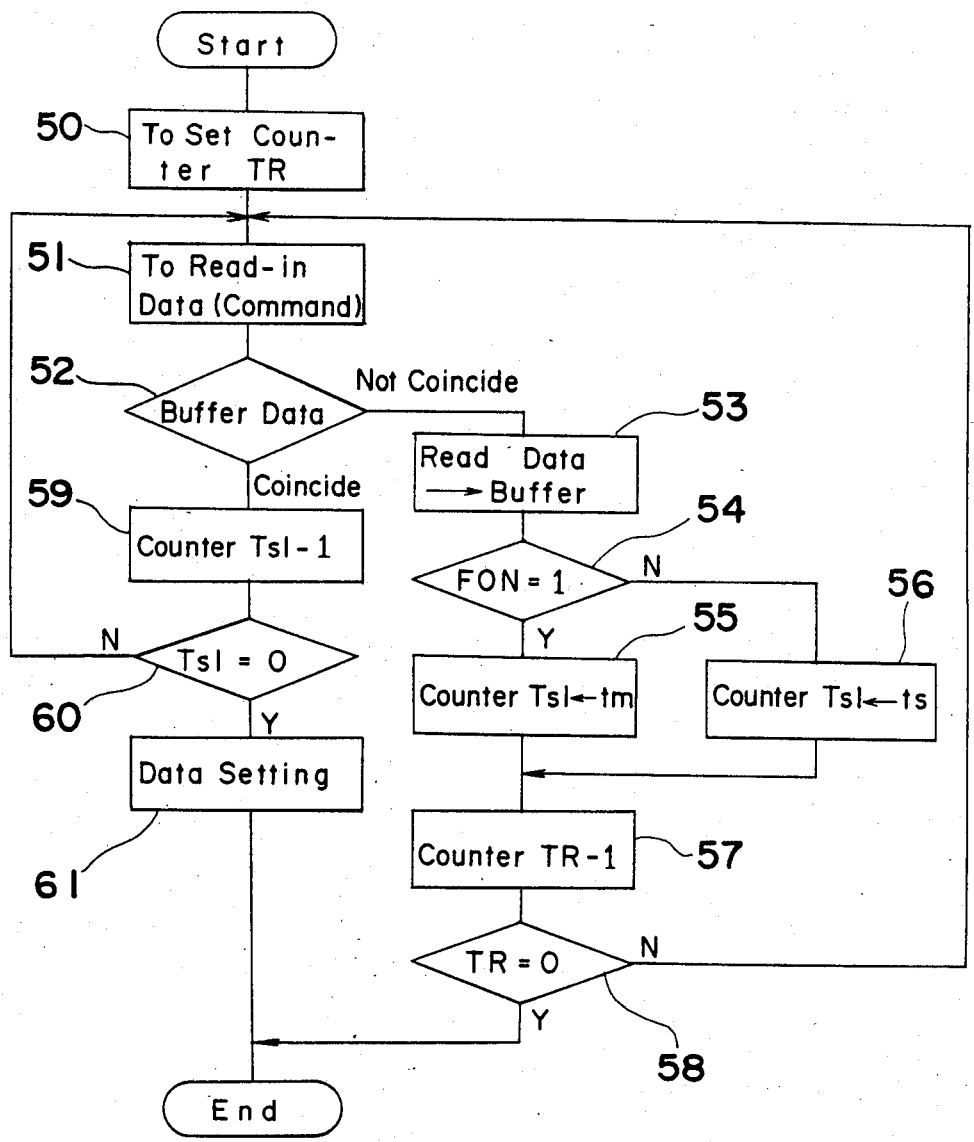
FIG. 6 is a diagram showing a process routine for reading in data, or command.

The routine for reading the command and the data, (such as each of the steps 22, 34 and 35), will now be described with particular reference to FIG. 6. When the program flow proceeds to this routine, the time control counter TR is set to a predetermined time at a step 50. This time control counter TR serves to count down the number of the digits of counter TR serves to count down the number of the digits of the data. The data (or the command) on the data line-bundle D are read out at the subsequent step 51 and are then compared with data retained in the buffer B at the step 52. If the data on the line-bandle D do not coincide with that in the buffer B, the data so read out are shifted to the buffer B at a step 53, followed by a decision step 54 at which the state of the flag Fon is checked. If the result of the determination at the step 54 indicates that the flag Fon has been set, meaning that the system control is effected to the control object 5, the counter TR is set with a predetermined value tm at a step 55. If, on the contrary, it indicates that the flag Fon has not been set, meaning that the system control is not effected to the control object, the counter TS is set to a predetermined value ts at a step 56. These values tm and ts each represent the number of times of coincide operation at step 52 should be repeated by repeating the routine of steps 51, 52, 59 and 60, as will be described later.

At a step 57, since one of the data, that is, the command has been inputted, the counter TR is decremented by one. At the subsequent step 58, it is determined whether or not the content of the counter TR has become zero. If the result of the determination at the step 58 indicates that the content of the counter TR has become zero, the routine is forcibly terminated even though the data are being read in. On the other hand, if the result of the determination at the step 58 indicates that the content of the counter TR has not become zero yet, the flow proceeds back to the step 51 to continue the reading of the data (command).

Returning again to step 51, since the reading at the step 51 at this time takes place after a very short period of time subsequent to the previous cycle, the same command, or data, as that read in in the previous cycle is again read in at the step 51. Then at step 52, the command, or data, read in at this time is compared with the command, or data, read in during the previous cycle as stored in the buffer. As a result, a coincidence takes place and, therefore, the flow proceeds to a step 59 at which the counter TS, either carrying a predetermined value tm or ts, is decremented by one. Then, at the subsequent step 60, it is determined whether or not the content of the counter TS has become zero, that is whether or not the routine of steps 51, 52, 59 and 60 has been repeated for a predetermined number of times tm or ts. If it is determined that the content of the counter TS has not become zero yet, the process of the steps 51, 52, 59 and 60 is repeated. However, when the content of the counter TS has become zero, the command, or data, presently read in is recognized as proper. Then, at a step 61, the data are set, ending the procedure of FIG. 6.

It is to be noted that, since there is a possibility that, during the system control being effected to the control object 5, the output unit 9 of the control unit 6 may generate noises to such an extent as to adversely affect the data transmission, the value tm to be set in the counter TR during the system control is selected to be greater than the value ts to be set in the counter TS during the non-system control. By way of an example, assuming that the values tm and ts are selected to be 100 and 10, respectively, the counter TS will be set to 100 during the performance of the system control. Therefore, when the counter TS is set with the value tm, the same data are read in repeatedly for 100 consecutive times, before the procedure advances to step 61. Accordingly, the data set at the step 61 are rendered sufficiently reliable. The reading of 100 consecutive times, as well as 10 consecutive times, is effected in accordance with the clock pulses, as shown in FIG. 4, row (f). On the other hand, when the counter TS is set with a value ts, the same data are read in repeatedly for only 10 consecutive times, before the procedure advances to step 61. In this case, since hardly any noise signals are produced during a non-system control period, high reliability can be assured even though the number of coincidence is relatively small, such as 10. Furthermore, in the non-system control periods, the time required to transmit the data can be reduced, thereby permitting the other controls to be carried out.

Although the present invention has been described in connection with the preferred embodiment thereof with reference to the accompanying drawings, it is to be noted that various changes and modifications are apparent to those skilled in the art. By way of example, although the foregoing description has been directed to the data transmission in the temperature control system, the concept of the present invention can equally apply to the data transmission in any other device wherein the speed of transmission of the data is relatively low. In addition, the present invention can equally apply to a humidity control system.

What is claimed is:

1. A system for transmitting data between a transmitter and a receiver through a transmission line, comprising:
   a transmitter on one end of the transmission line producing data to be transmitted on the transmission line from the transmitter for a predetermined time;
   a control output device connected to the transmitter which outputs a number whose value depends on the state of operation of said control output device during the period of time data are transmitted through the transmission line; and a receiver on another end of the transmission line comprising setting means connected to the control output device for setting a number of times for repeatedly reading in said data by said receiver, said number being the number output by the control output device, reading means for reading in repeatedly and consecutively said data the number of times set by the setting means during the predetermined time in which the data are produced on the transmission line, and accepting means for accepting the data only when the data are read, without any change, for said number of times.

* * * * *